United States Patent
Kim et al.

[11] Patent Number: 5,684,303
[45] Date of Patent: Nov. 4, 1997

[54] PYROELECTRIC INFRARED RADIATION DETECTOR

[75] Inventors: Tae-ho Kim, Ansan; Sung-soo Lee, Suwon, both of Rep. of Korea

[73] Assignee: Samsung Electronics, Co., Suwon, Rep. of Korea

[21] Appl. No.: 708,773

[22] Filed: Sep. 5, 1996

[30] Foreign Application Priority Data

Dec. 30, 1995 [KR] Rep. of Korea .................... 95-55241

[51] Int. Cl.[6] ................................................ G01J 5/10
[52] U.S. Cl. ........................................ 250/338.3
[58] Field of Search ........................................ 250/338.3

[56] References Cited

U.S. PATENT DOCUMENTS 4,626,687  12/1986  Nara et al. ..................... 250/338.3
4,825,079   4/1989  Takamatsu et al. ............ 250/338.3
4,933,559   6/1990  Tamura et al. ................. 250/338.3
4,973,843  11/1990  Murata et al. ................. 250/338.3

FOREIGN PATENT DOCUMENTS 358 002  8/1989  European Pat. Off. .

Primary Examiner—Carolyn E. Fields
Attorney, Agent, or Firm—Burns, Doane, Swecker & Mathis LLP

[57] ABSTRACT

A pyroelectric infrared radiation detector is capable of removing internal noise generated in a pyroelectric element as well as noise due to a power source in the manner that the induction noise of exterior high-frequency noise due to an inductance component in an outer lead wire is removed by connecting a second filter to a drain electrode of a FET, and the high-frequency interior noise is removed by installing a first filter between the pyroelectric element and FET. Therefore, a body sensing signal can be obtained by using only one pyroelectric element.

4 Claims, 2 Drawing Sheets

PYROELECTRIC INFRARED RADIATION DETECTOR

BACKGROUND OF THE INVENTION

The present invention relates to a pyroelectric infrared radiation detector, and more particularly, to a pyroelectric infrared radiation detector which is capable of removing internal noise generated inside the pyroelectric infrared radiation detector, as well as noise from an external lead wire due to external high-frequency and power source noises (hereinafter, "external noise").

FIG. 1 is a circuit diagram of a conventional pyroelectric infrared radiation detector using a field effect transistor (FET). As described in FIG. 1, the pyroelectric infrared radiation detector comprises a pyroelectric element 1, a field effect transistor (FET) 2 as an amplifying means, a gate resistor Rg, a drain lead wire 3, a source lead wire 4, a ground lead wire 5, a shield case 6, an infrared radiation transmitting window 7, a power source 8 and resistors rD and rs. Here, the FET 2 includes gate, drain, and source electrodes G, D, and S. Also, the resistor rD is connected in series with the drain electrode D and the resistor rS is connected in series with the electrode S within the shield case 6.

In the infrared radiation detector having such a configuration, as the infrared radiation transmitted through the window 7 collects on the pyroelectric element 1, the charge of the pyroelectric element 1 varies. Thus, with the variation of the gate voltage at both edges of the gate resistor Rg, the intensity of the source current varies. The variation in the source current can be detected by measuring the source voltage at both edges of the source resistor Rs installed outside the shield case 6.

However, in the pyroelectric infrared radiation detector described above, since the lead wires 3, 4, and 5 outside the shield case 6 have an inductance component at high frequencies. By this inductance component, induction noise is generated due to external high frequency signals. This induction noise flows into the internal circuit of the pyroelectric infrared radiation detector and causes error. That is, there is a distribution capacitance between the gate and drain electrodes G and D of the FET 2 in a high-frequency range, which makes the induction noise feedback into the internal circuits, more particularly, the high-frequency induction noise generated in the drain lead wire 3 transfers through the distribution capacitance to the gate and exerts an effect on the gate voltage to thereby apply an error signal to a circuit for detecting the source voltage.

In an attempt to solve the above problem, the resistors rD and rS were connected to the respective drain and source electrodes D and S in the shield case 6. The resistors rD and rS operate as a large impedance with respect to high-frequency induction noise due to a reactance component, but operates as a direct resistance element with respect to a signal for detecting low-frequency (about 1 Hz) infrared radiation. Thus, the high-frequency noise induced to the exterior lead wire 3 and input to the electrode D is attenuated by the resistors rD and rS, whereby error signals appearing on the source lead wire 4 as the output of the detector are reduced.

FIG. 2 is a circuit view of another conventional pyroelectric infrared radiation detector, where the same reference numerals as those of FIG. 1 denote the same components as those of FIG. 1. This detector includes a capacitor 9 instead of the resistors rD and rS (FIG. 1), to prevent error signals due to high-frequency noise.

However, although the resistors rD and rS and the capacitor 9 provided in the two conventional pyroelectric infrared radiation detectors for preventing the high-frequency noise is capable of effectively removing external noise, they are incapable of removing internal noise generated in the pyroelectric element, thereby causing error signals in the pyroelectric infrared radiation detector.

SUMMARY OF THE INVENTION

It is an object of the present invention to provide a pyroelectric infrared radiation detector which is capable of removing internal noise generated by the pyroelectric element as well as external noise.

To accomplish the above object, there is provided a pyroelectric infrared radiation detector having a pyroelectric element, means for amplifying a signal detected in the pyroelectric element, and a bias resistor for providing the detected signal as a bias voltage to the amplifying means, comprising: a first filter installed between the pyroelectric element and the bias resistor for blocking internal noise in the pyroelectric element by passing only a body sensing signal; and a second filter installed between the amplifying means and a power source for removing external noise induced by an outer lead wire.

According to the present invention, the first filter comprises: a first resistor connected to a terminal of the pyroelectric element and a gate electrode of the field effect transistor; and a first capacitor connected to the gate electrode and a ground to which the other terminal of the pyroelectric element is connected.

The second filter comprises: a second resistor connected to a drain electrode of the field effect transistor and the power source; and a second capacitor connected to the power source and a ground.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
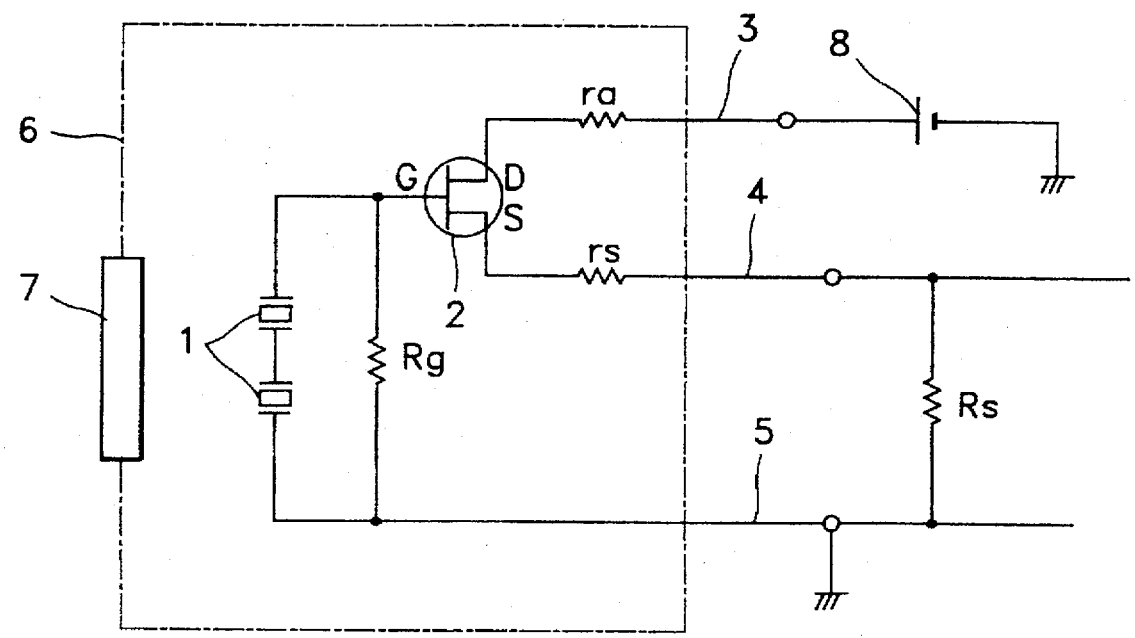
FIG. 1 is a circuit diagram of a conventional pyroelectric infrared radiation detector.
Figure 2:
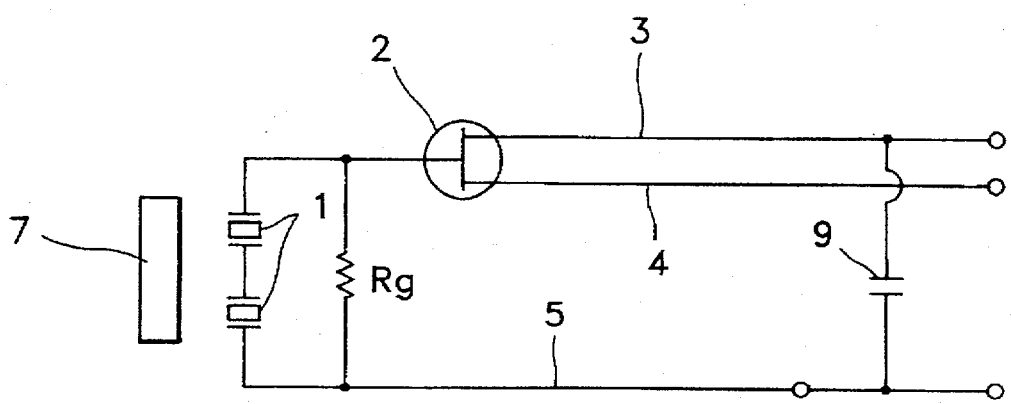
FIG. 2 is a circuit diagram of another conventional pyroelectric infrared radiation detector.
Figure 3:
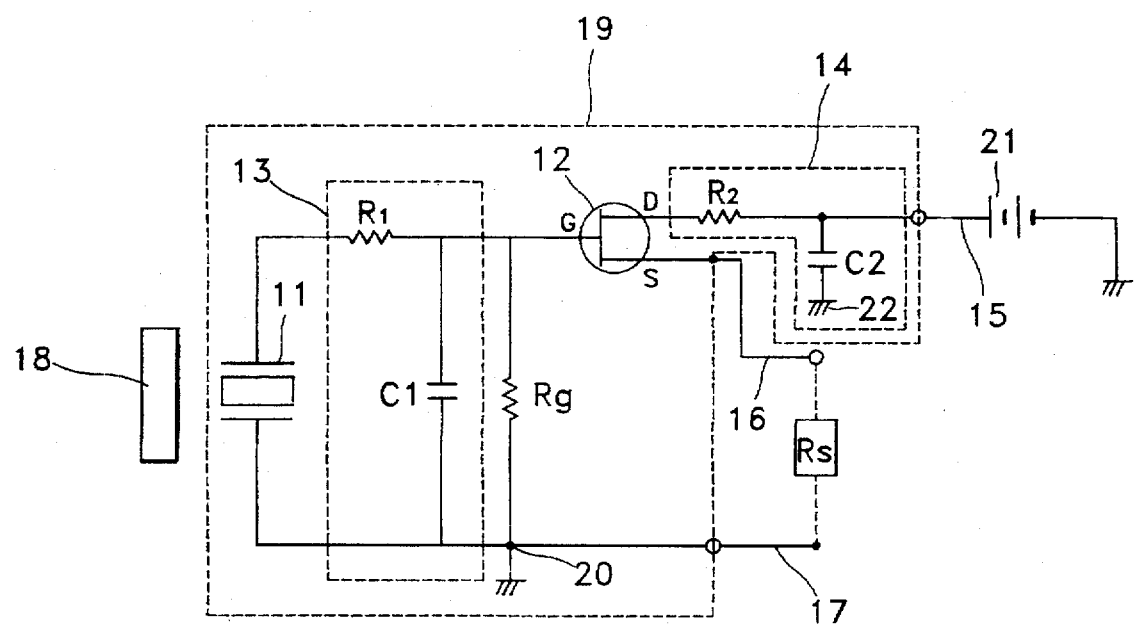
FIG. 3 is a circuit diagram of a pyroelectric infrared radiation detector according to the present invention.

As described in FIG. 3, the pyroelectric infrared radiation detector according to an embodiment of the present invention includes a pyroelectric element 11, an FET 12 as an amplifying means having gate, drain, and source electrodes G, D, and S, a bias resistor Rg connected to the gate electrode G of the FET 12 and a ground 20, first and second filters 13 and 14, and a shield case 19. Here, the first filter 13 includes a first resistor R1 connected to a terminal of the pyroelectric element 11 and the gate electrode G of the FET 12, and a first capacitor C1 connected to the gate electrode G of the FET 12 and the ground 20. Also, the first filter 13 is designed to pass only a body sensing signal generated in the pyroelectric element 11, thereby intercepting high-frequency noise generated in the pyroelectric element 11. The second filter 14 comprises a second resistor R2 connected to the drain electrode D of the FET 12 and a power source 21, and a second capacitor C2 connected to the power source 21 and a ground 22. The second filter 14 removes high-frequency induction noise introduced together with the electric power from an external lead wire 15.

The pyroelectric infrared radiation detector according to the embodiment having such a configuration operates as follows. Infrared radiation passes through a window 18 and is received in the pyroelectric element 11. Then, a body sensing signal is generated corresponding to the variation of the charge amount in the pyroelectric element 11. As the gate voltage formed in the bias resistor Rg varies with the charge amount, the source current also varies. This variation of the source current is detected by measuring the variation of the source voltage via a source resistor Rs installed outside the detector. At this time, high-frequency internal noises are filtered out by the first filter 13. Thus, only the body sensing signal generated in the pyroelectric element 11 is transmitted to the gate electrode G of the FET 12. Meanwhile, the second filter 14 removes external noise induced by the external high-frequency signals due to an inductance component of external lead wires 15, 16, and 17 outside the shield case 19.

According to the pyroelectric infrared radiation detector of the present invention, since internal and external high-frequency noises are respectively removed by the first and second filters 13 and 14, a final detecting circuit signal can be obtained by using only one pyroelectric element.

As described above, the pyroelectric infrared radiation detector of the present invention can remove not only the induction noise of the external high-frequency due to the inductance component in the external lead wire but also the high-frequency noise being generated inside the pyroelectric element. Therefore, the body sensing signal can be obtained by using only one pyroelectric element.

What is claimed is:

1. A pyroelectric infrared radiation detector having a pyroelectric element, means for amplifying a signal detected in said pyroelectric element, and a bias resistor for providing the detected signal as a bias voltage to said amplifying means, comprising:

a first filter installed between said pyroelectric element and said bias resistor for blocking internal noise in said pyroelectric element by passing only a body sensing signal; and a second filter installed between said amplifying means and a power source for removing external noise induced by an outer lead wire.

2. A pyroelectric infrared radiation detector as claimed in claim 1, wherein said amplifying means is constituted by a field effect transistor.

3. A pyroelectric infrared radiation detector as claimed in claim 2, wherein said first filter comprises:

a first resistor connected to a terminal of said pyroelectric element and a gate electrode of said field effect transistor; and a first capacitor connected to said gate electrode and a ground to which the other terminal of said pyroelectric element is connected.

4. A pyroelectric infrared radiation detector as claimed in claim 3, wherein said second filter comprises:

a second resistor connected to a drain electrode of said field effect transistor and said power source; and a second capacitor connected to said power source and a ground.

* * * * *